Figure 1:
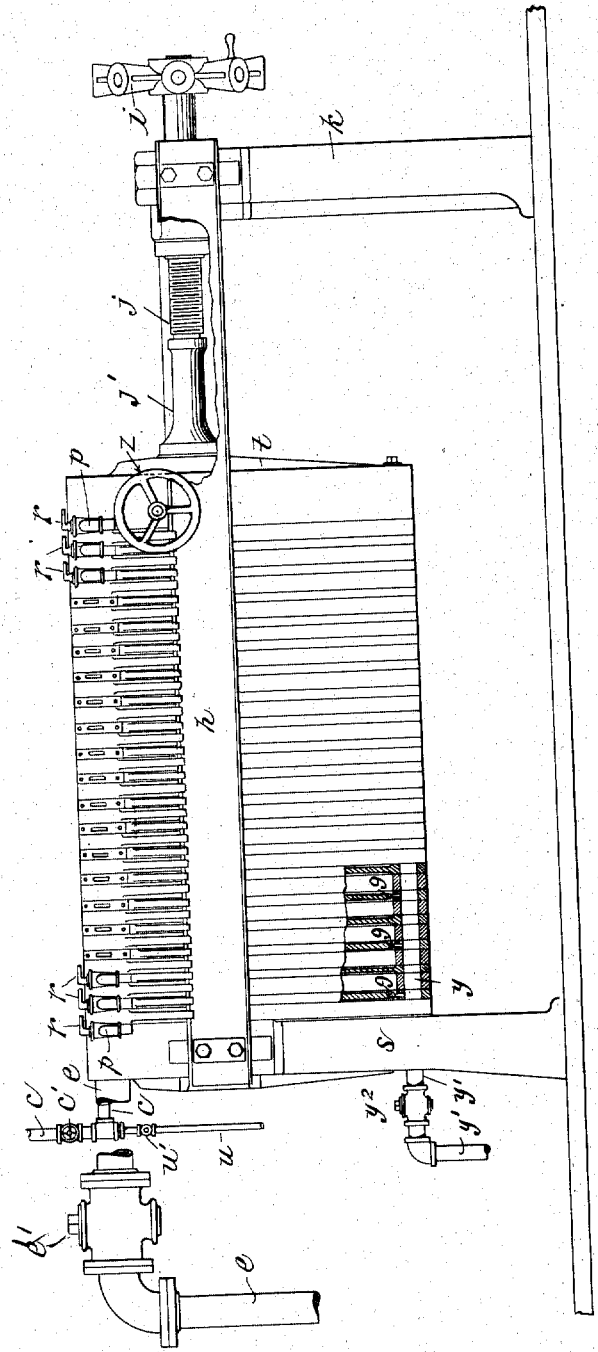

C. W. MERRILL.
APPARATUS FOR SEPARATING UNFILTERABLE MATERIAL FROM A MIXTURE OF FILTERABLE AND UNFILTERABLE MATTER.
APPLICATION FILED JUNE 7, 1910. RENEWED FEB. 16, 1917.

1,226,103.

Patented May 15, 1917.
3 SHEETS—SHEET 1.

C. W. MERRILL.
APPARATUS FOR SEPARATING UNFILTERABLE MATERIAL FROM A MIXTURE OF FILTERABLE AND UNFILTERABLE MATTER.
APPLICATION FILED JUNE 7, 1910. RENEWED FEB. 16, 1917.
1,226,103.
Patented May 15, 1917.
3 SHEETS—SHEET 2.
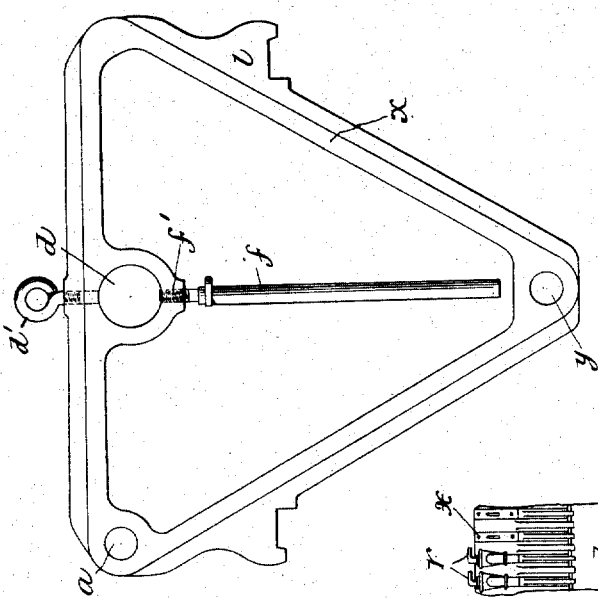
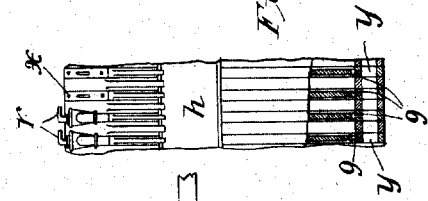
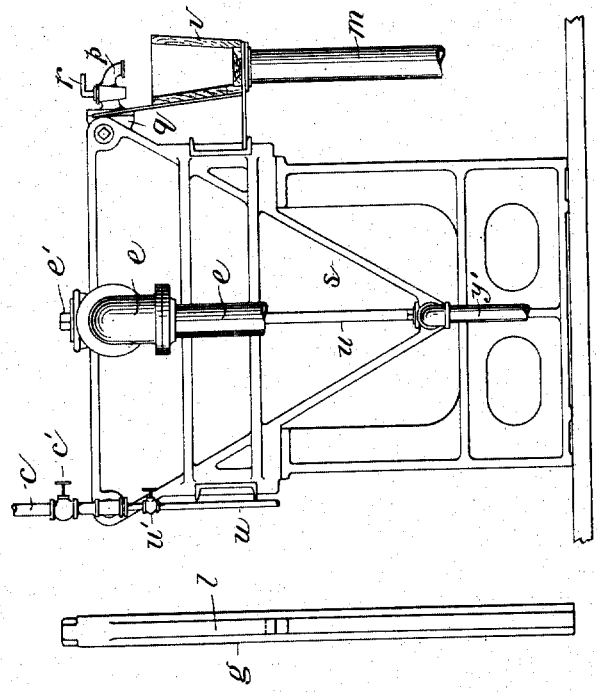
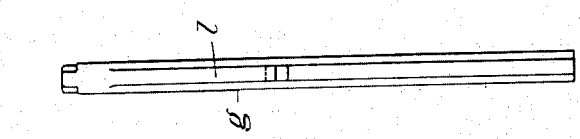
Witnesses:
Edward C. Rowland.
Charles Engel.
Inventor
Charles W. Merrill
By his Attorney

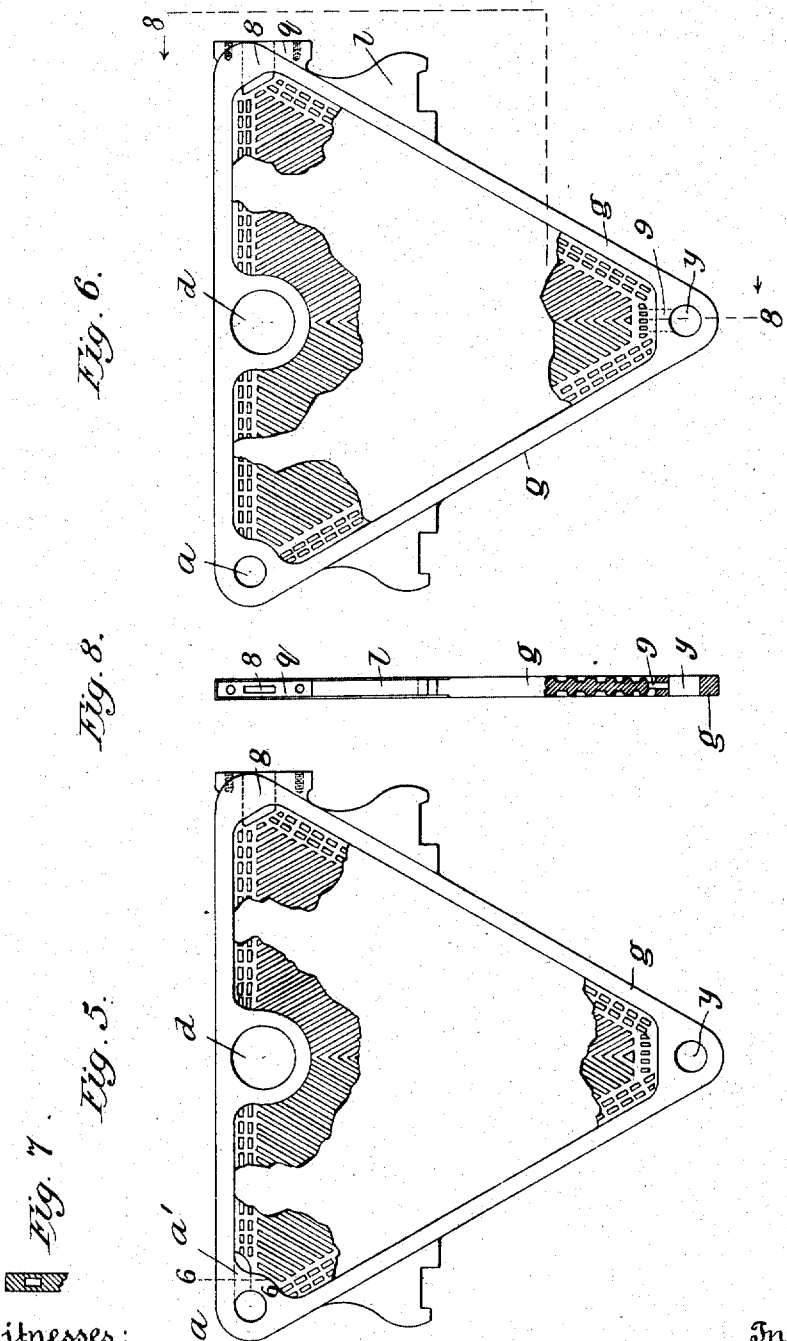

UNITED STATES PATENT OFFICE.

CHARLES W. MERRILL, OF BERKELEY, CALIFORNIA.

APPARATUS FOR SEPARATING UNFILTERABLE MATERIAL FROM A MIXTURE OF FILTERABLE AND UNFILTERABLE MATTER.

1,226,103.  Specification of Letters Patent.  Patented May 15, 1917.

Application filed June 7, 1910, Serial No. 565,545. Renewed February 16, 1917. Serial No. 149,146.

*To all whom it may concern:*

Be it known that I, CHARLES W. MERRILL, a citizen of the United States of America, and resident of Berkeley, Alameda county, State of California, have invented new and useful Improvements in Apparatus for Separating Unfilterable Material from a Mixture of Filterable and Unfilterable Matter, of which the following is a specification.

My invention relates to improvements in apparatus for separating unfilterable material from a mixture of filterable and unfilterable matter. It particularly relates to improvements in pressure filters in which the precipitation and collection of material from hydrometallurgical solutions and the treatment of such material is effected. In Letters Patent No. 900,186, granted to me by the United States Patent Office on October 6, 1908, I described and claimed an improved process of precipitating materials from solution, and particularly metals from hydro-metallurgical solutions, and in Letters Patent No. 900,185, also granted to me by the United States Patent Office on October 6, 1908, I have described and claimed an apparatus in which the aforesaid process can be commercially carried out. The principal object of the present invention is to overcome certain disadvantages which are found to exist in practice, in conducting the process aforesaid in the apparatus described and claimed in Letters Patent No. 900,185.

In the above specifications, the advantages of maintaining reducing conditions throughout the precipitation and collection of precipitate are described and the said process specifications provide for the maintenance of these reducing conditions up to the time that the mixture of solution precipitant and precipitate is delivered to the inlet channel of the pressure filter described and claimed as above.

Now the mechanical defects which have developed in the above apparatus are first that the flow of the mixture through some at least of the cores within the side walls of the containers sometimes becomes impeded thus preventing the delivery of a supply of mixture adequate at all times to keep the container filled during the operation of the filter press; second, some mixtures filter so freely that the bottom discharge of the filtrate results in the press not being kept full of the mixture of filterable and unfilterable matter; third, it is not always possible in the practical operation of reduction works to deliver to the filter press continuously a sufficient feed of the mixture of filterable and unfilterable material to keep it full, and, fourth, when the filter press is not in use the practical difficulty of preventing the discharge cocks from leaking results in at least a portion of the liquid filterable portion draining out. The result of any of the above mechanical defects is that oxygen of the atmosphere occupies the space that should be filled with the mixture or its filterable component, and the effect of the contact of the oxygen with the mixture or its unfilterable component is to oxidize the precipitate and precipitant contained in the press and thus decrease the efficiency of precipitation and increase the cost of precipitation, as that portion of the latter which is oxidized is unavailable for further precipitation.

Now, I have discovered that when, instead of the ducts leading from a port within each container and preferably located at the bottom thereof, to a horizontal feed channel located above the outlet, and preferably in an upper corner of the container, as described in said Letters Patent No. 900,186, a pipe or an independent duct, preferably composed essentially of non-metallic material which is also non-conducting as to galvanic action, is employed leading downward from the feed channel into the bottom of the converging container and adjacent thereto, and an open top discharge, as distinguished from a bottom discharge, is employed in combination therewith, all of the difficulties above referred to are minimized and the results of the process described in Letters Patent 900,185, when carried out in this apparatus, are more satisfactory.

The type of filter press forming the subject of the present invention is what is known as an open top delivery and closed bottom drain press, and will be best understood by a reference to the accompanying three sheets of drawings, of which Figure 1 shows a side elevation of the press with the filter plates and containers assembled therein; Fig. 2 is a front end elevation of the press; Fig. 3 is an elevation of one of the containers; Fig. 4 is a vertical elevation of the same; Figs. 5 and 6 are elevations, Fig. 7 a detail, and Fig. 8 is a sectional elevation of a filter plate; Fig. 9 is a detail view showing a modified form of filter plate.

Similar letters refer to similar parts throughout the several views.

*General characteristics.*—In Figs. 1 and 2 of the drawings, $s$ represents what is for convenience termed the stationary end of the press; $h$ the side bar of the press; $j$ is a screw carrying a distance piece $j^1$ which forces the movable end or follower head $t$ forward in the side bars by means of the wheels $i$ or any other convenient mechanism; $x$ $x$ are the exterior frames of a series of containers, and $g$ $g$ are the filter plates, and $k$ is the rear stationary end of the press. All of these devices and parts are common to the ordinary form of filter press. These elements when set up compose the filter press substantially as shown in Figs. 1 and 2. For convenience the different parts of the apparatus will be described separately.

*The filter plates.*—The filter plates are preferably of the type of construction as shown in Figs. 5, 6, and 8 which show the form of filter plate adapted to be used in connection with the forms of container hereinafter described. Each filter plate is provided with an opening $d$ through which the material to be filtered is introduced, which channel or inlet is of the same general character as that in the containers and becomes continuous when the various parts are put together in the filter press. Each filter plate may be and ordinarily is provided with an opening $a$ through which the liquids, vapors or gases pass for any treatment of the unfilterable material after its collection in the press, and which, with the corresponding openings in the containers hereinafter described, when placed together in the filter press, make a continuous channel. Each alternate filter plate is provided with a port $a'$ as shown in Figs. 5 and 7 through which the liquids, vapors or gases from the channel or inlet $a$ may be introduced behind the filter cloths of each such alternate filter plate. The surfaces of the filter plates are provided, as shown in Figs. 5 and 6 and 8, with any convenient arrangement of grooves or corrugations, preferably the arrangement described and claimed by me in Letters Patent of the United States No. 912,867. A drainage opening $y$ is provided in the bottom of the filter plate which becomes a continuous channel when the plates and containers are assembled in the press.

8 8 are the outlets in each of the filter plates, as shown in Figs. 5, 6 and 8 which are provided for the effluent liquids, vapors or gases. They terminate in each case in a boss $q$, to which are fastened stop cocks $p$, as shown in Figs. 1 and 2, controlled by the handles $r$, which discharge into a trough $v$ of suitable dimensions. In each case $d$ represents the inlet through which the mixture of solid and semi-solid or unfilterable material with liquid is introduced. In practice the openings 8 and 9 will be placed, the former at or near the top, and the latter at or near the bottom of the filter plate, as shown in the drawings, but their precise location is no part of the present invention. There is a drainage port 9 from each alternate plate into the channel $y$, as it is only necessary to have an opening behind the cloths which form the closure on the one side of a container in order to properly drain such container.

*Containers.*—The type of container employed in the constructions shown is shown in Fig. 3. $x$ $x$ are the exterior frames of the containers. These fit into the frame of the press between the filter plates as shown in Figs. 1 and 2. $d$ is the horizontal feed channel located in the center at the top of the container through which the mixture of filterable and non-filterable component is introduced into the press. $a$ is an inlet through which liquids, vapors or gases may be introduced behind the filter cloths. When a series of containers is put together in a filter press, the openings $a$, $d$ and $y$ make three continuous openings or channels through the press which are closed at the end in any convenient manner.

Instead of ducts within the side walls of the containers which are used in certain of the forms of containers which I have hitherto employed, I employ in the present case an independent removable duct $f$ of any suitable material, preferably a non-metallic material which is non-conducting as to galvanic action which leads downward from the feed channel $d$ into the bottom of the container and terminates adjacent thereto.

The object of substituting a non-metallic material for the form and duct which I have hitherto employed is to prevent the precipitant from forming on the surface of the interior of the duct and clogging the duct and preventing the subsequent free passage of the mixture. The metallic zinc in suspension in the solution to be treated in the press, in contact with the iron of the duct, exerts a galvanic action, causing changes in the chemical contents of the solution to take place, and the precipitation of a cementing material therefrom, which builds up in the interior of the iron pipe and chokes it. The duct $f$ preferably composed of hose and a pipe nipple $f^1$ is removable and fits into a suitable screw thread opening in the channel $d$ and may be of any definite size, and in practice any number of these pipes may be kept in stock for use in connection with any one filter, and hence when they become choked or stopped up they may be readily removed and another pipe inserted for use while those removed are being cleaned. In this way the press does not have to be kept out of service for an unnecessarily long time.

In practice, the duct $f$ is screwed into that part of the upper wall of the container which forms the bottom of the feed channel $d$ in the manner shown in Fig. 3, but any desirable method for connecting up the pipe duct with the feed channel may be employed.

The channel $y$, Fig. 1, terminates in a pipe $y^1$ closed by the valve $y^2$ by opening which the liquid portion of the contents of the containers are drained or forced out for the more convenient subsequent removal of the solid portion of the contents.

The trough $v$ discharges through a duct $m$ through a pipe into a suitable receiving tank.

The mixture of filterable and unfilterable material is charged under pressure through the pipe $e$, controlled by the inlet cock $e'$ into the feed channel $d$. The liquid, gas or vapor employed is fed into the channel $a$ through the pipe $c$, controlled by the valve $c'$, as shown in Figs. 1 and 2. In order to permit the discharge of any gas which may be formed in the press at any time, a vent $u$ is provided with the cock $u'$ through which such gases may escape through the channel $a$ with which this vent is directly connected. When it is desired to permit the escape of such gases, the valve $c'$ is closed and the valve $u'$ is opened.

For the purpose of moving the follower head the hand wheel $z$ is provided, as shown in Fig. 1. By turning this hand-wheel the follower-head $t$ is caused to slide backward and forward upon the frame $h$ which is sometimes desirable in very large presses.

The treatment channel $a$ opens through the ports $a'$ to the filtering surface behind the cloths of alternate plates, being in alternate series with the plates having drainage ports at the bottom, so that when the plates are put together in the press there will be a drainage opening from each plate which has no inlet for liquid, vapor or gas, and there will be no drainage outlet from those plates which have the openings, as it is only necessary to have an opening behind the cloths which form the closure on one side of the container in order to properly drain the container.

The treatment channel $a$ is not a vital factor or element of this invention, and may be entirely omitted in cases where it is not desired to treat the unfilterable material after its collection in the press; or when used it may be located wherever desired.

I claim as my invention:

1. The combination in a pressure filter of a series of suitable filter plates, one or more containers converging toward the bottom, each provided with a duct leading from a feed channel located above the bottom of the container and terminating within the same adjacent to said bottom, and a suitable outlet through the upper portion of the side-wall of each filter plate whereby the filtrate is discharged by means of a suitable delivery.

2. A container for use in a pressure filter provided with a non-metallic duct of convenient size and suitable material, leading from a feed channel located above the bottom of the container and terminating within the same at or near said bottom.

3. A container for use in a pressure filter provided with a removable non-metallic duct of convenient size and suitable material, leading from a feed channel located above the bottom of the container and terminating within the same at or near said bottom.

4. A container for use in a pressure filter provided with a non-metallic removable duct of convenient size and made of suitable material, leading from a feed channel located above the bottom of the container, and terminating within the same at or near the bottom thereof, and devices substantially as described for attaching the duct to the feed channel.

5. A container for use in a pressure filter provided with a non-metallic duct of convenient size and suitable material, leading from a feed channel located above the bottom of the container and terminating within the same at or near said bottom and connected with said feed channel in any suitable manner.

6. A container for use in a pressure filter provided with a non-metallic duct of convenient size and suitable material, leading from a feed channel located above the bottom of the container and terminating within the same at or near said bottom and connected with said feed channel by means of a suitable screw device.

In testimony, that I claim the foregoing as my invention, I have signed my name in presence of two witnesses, this twenty-sixth day of May 1910.

CHARLES W. MERRILL.

Witnesses:
WILLARD PARKER BUTLER,
CHARLES ENGEL.